(12) United States Patent
Gehrke et al.

(10) Patent No.: US 6,442,561 B1
(45) Date of Patent: Aug. 27, 2002

(54) METHOD OF CONSTRUCTING BINARY DECISION TREES WITH REDUCED MEMORY ACCESS

(75) Inventors: Johannes E. Gehrke; Venkatesh Ganti; Raghu Ramakrishnan, all of Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/465,203

(22) Filed: Dec. 15, 1999

Related U.S. Application Data

(60) Provisional application No. 60/112,701, filed on Dec. 18, 1998.

(51) Int. Cl.[7] ............................................. G06F 17/30
(52) U.S. Cl. ............................................................ 707/102
(58) Field of Search ......................... 707/1, 6, 100, 707/101, 102, 104.1; 706/12, 45

(56) References Cited

U.S. PATENT DOCUMENTS 5,787,274 A * 7/1998 Agrawal et al. ............ 707/102

* cited by examiner

Primary Examiner—Diane D. Mizrahi
Assistant Examiner—Apu M Mofiz
(74) Attorney, Agent, or Firm—Quarles & Brady LLP

(57) ABSTRACT

A method of creating and updating a binary decision tree from training databases that cannot be fit in high speed solid state memory is provided in which a subset of the training database which can fit into high speed memory is used to create a statistically good estimate of the binary decision tree desired. This statistically good estimate is used to review the entire training database in as little as one sequential scan to collect statistics necessary to verify the accuracy of the binary decision tree and to refine the binary decision tree to be identical to that which would be obtained by a full analysis of the training database.

18 Claims, 4 Drawing Sheets

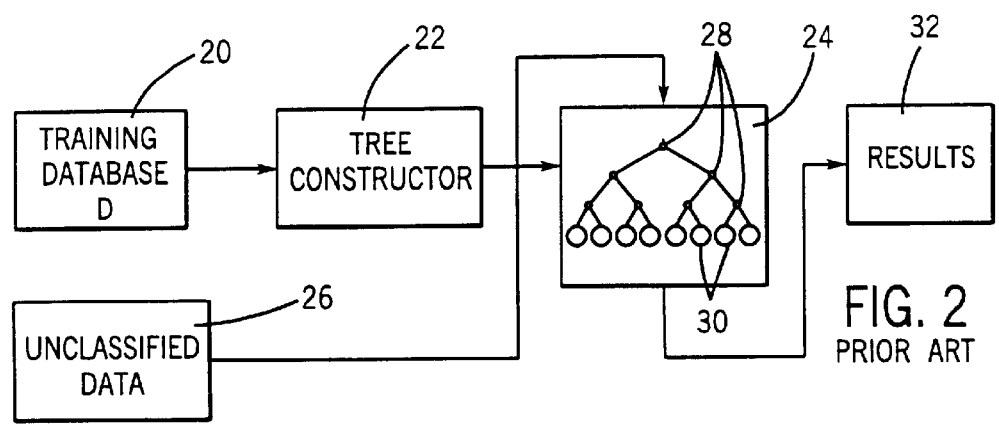
FIG. 1
PRIOR ART
FIG. 2
PRIOR ART
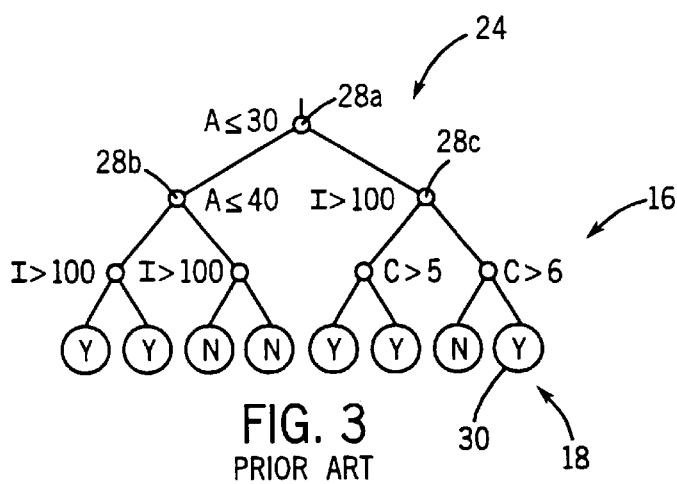
FIG. 3
PRIOR ART

METHOD OF CONSTRUCTING BINARY DECISION TREES WITH REDUCED MEMORY ACCESS

CROSS-REFERENCE TO RELATED APPLICATIONS

This application claims the benefit of U.S. Provisional application No. 60/112, 701 filed Dec. 18, 1998 and hereby incorporated by reference.

STATEMENT REGARDING FEDERALLY SPONSORED RESEARCH OR DEVELOPMENT

BACKGROUND OF THE INVENTION

The present invention relates to computer techniques for developing binary decision trees from a training database, such decision trees used for classifying records according to probabilities derived from the training database. Specifically, the present invention provides a way of preparing or updating binary decision trees from very large training databases held in slow memory such as disk drives, the method reducing the necessary access to the slow memory.

Referring to FIG. 1, a large training database 10 has records 12 including a record identifier 14, record attributes 16, and a classification 18. For example, the record identifier 14 may be the name of a customer and the attributes may be the customer's AGE, INCOME, and number of CHILDREN. The classification 18 may be, for example, whether the customer responded to a promotional coupon for children's toys.

Desirably, the classification 18 could be determined for existing customers in a unclassified data 26 whose attributes 16 are known but who have not yet responded to the promotional coupon and thus cannot be classified. "Data mining" seeks to establish a predictive classification of records based on the record's attributes 16.

Referring to FIG. 2, the classification of records from their attributes may be accomplished by preparing a binary decision tree 24 from the training database 20 using any of a number of tree constructors 22 executed on an electronic computer as are well known in the art. The binary decision tree 24 is then used to sort the unclassified data 26 to produce as results 32 the appropriate classification.

Referring to FIG. 3, the binary decision tree 24 follows general tree topology including a root node 28a (shown at the top of FIG. 3), a number of intermediate nodes 28, and leaf nodes 30 (shown at the bottom of FIG. 3). Each intermediate node 28 is assigned to a particular attribute 16 and a split point in the domain of the attribute 16 which defines how records are to be sorted or passed to the nodes below. Each leaf node 30 is assigned to a particular classification.

The unclassified data 26 are sorted by comparing their attributes and the values of those attributes against the attributes and split points of each node starting at root node 28a and then passing the record according to that split point to the next lower node 28b. Thus, for example, the root node 28a may relate to the AGE attribute and have a splitting of AGE 30 (and a "splitting predicate") that AGE must be less than or equal to 30). The records 12 of FIG. 1 are thus sorted at the root node 28a so that if their AGE attribute 16 has a value of less than 30, the record 12 proceeds down the right branch of the tree from root node 28a, but if the AGE attribute has a value greater than 30, the record 12 proceeds down the left branch of the tree from root node 28a. The branches from node 28a lead to additional nodes 28b and 28c, each also having an attribute and a splitting predicate and this process is repeated until the records arrive at a leaf node 30 where a category may be assigned. Note that the attributes for 28b and 28c need not be the same and in this case are AGE and INCOME, respectively.

The attributes 16 need not be numerical but may be categorical, for example, male or female, in which case the splitting predicate is a subset of the attributes' domain.

Referring to FIG. 4, the tree constructor 22 which creates the binary decision tree 24 from the training database 20 may operate according to a number of well known algorithms to determine the attributes, their order within the binary decision tree 24, and the appropriate splitting predicates. A general model of a tree constructor 22 includes a sorter 35 receiving the records 12 and at each node 28 dividing them into left and right groups 38 and 40 according to a trial splitting predicate 36. The left and right groups 38 and 40 are provided to a goodness evaluator 42 which determines how effective the trial splitting predicate 36 is according to some predetermined criteria related to the classifications of the records of the left and right groups 38 and 40, for example, an impurity function.

The trial splitting predicate 36 is adjusted appropriately based on this determination and the records 12 reviewed again for evaluation. Ultimately, after possibly many reviews of the records, final splitting predicate 45 is produced (being an attribute, split point and relationship) for the node 28 and the process is repeated for other nodes 28. A goodness value 43 may be derived for each splitting predicate 45.

While particular tree construction algorithms vary, it can be seen that this process of determining splitting predicates 45 requires repeated access of the records 12. For large databases where the records 12 are held in relatively slow electronic memories, such as magnetic disk drives, constructing the binary decision tree 24 may be prohibitively time consuming. Even in cases where this investment in time is warranted for an initial generation of a binary decision tree 24, the time investment may discourage frequent updating of the binary decision tree 24 as additional data comes in.

One solution to the problem of slow memory access is to place the training database 20 in a high-speed memory such as those principally constructed of solid state transistors also known as random access memory (RAM). Such memories will be termed herein "high-access" memories distinguishing them from disk drives and other similar mass storage devices ("low access"), both in the speed of memory access and in the flexibility of that access (random vs. sequential) which may affect the time required to access the necessary data of the training database 20. These categories are not absolute but reflect the inevitable differences between accessibility and capacity of current and foreseeable memory systems.

Unfortunately, the solution of using high access memory exclusively is not available for many commercially valuable training databases 20 which are too large for this to be practical. What is needed is a method of constructing and updating training databases 20 that overcomes the time limitation inherent in the use of low-access memory.

BRIEF SUMMARY OF THE INVENTION

The present inventors have recognized that a binary decision tree constructed from a small subset of the training database (sized to fit entirely in high access memory) will nevertheless be close to the binary decision tree that would have been constructed with the entire training database. This "small-sample" binary decision tree constructed from the subset may be then used to coordinate an efficient review of the entire training database that reduces accesses to the memory in which it is stored.

Specifically, the present invention provides a method of data mining using a computer system having a first low-access memory holding a training database of a plurality of records having attributes and a second high-access memory smaller than the first memory. A subset of the training database is loaded into the second memory and the computer operates on that subset to prepare an initial binary decision tree having nodes associated with confidence intervals defining ranges of the attributes expected in the final binary decision tree for the entire training database. The entire training database is then read from the first memory against the confidence intervals of the binary decision tree to collect split point statistics related to the location of a split point within the confidence intervals. Using the split point statistics, a split point is assigned to each node.

Thus it is one object of the invention to speed the construction or updating of binary decision trees from large training databases. By using a subset of the training database to develop an initial binary decision tree, access to the first memory is substantially reduced. The initial binary decision tree may provide a confidence interval at each node indicating a probable location of a split point. Records within the confidence interval (needed to determine the exact split point) are small in number and may be stored in high access memory after a single scan of low access memory.

The method may include the step of reviewing the entire training database of the first memory against a plurality of bucket intervals outside the confidence interval.

This it is another object of the invention to collect error statistics which confirm that the confidence interval is correct or to catch those few situations where the initial confidence interval is erroneously selected and thus to provide a truly deterministic method of obtaining a binary decision tree from an arbitrarily large training database.

The binary decision tree may assign classification of records at its leaf nodes and the method may include the further step of applying an unclassified record to the binary decision tree to determine its classification.

Thus it is another object of the invention to provide a binary decision tree useful for data mining such as establishes the classification of records for which classification is not known.

The first memory may be a disk drive and the second memory a solid state memory system and the review of the entire training database may sequentially access each record of the training database only once.

Thus it is another object of the invention to provide a method of building binary decision trees that work efficiently with present day high and low access memory systems.

The initial binary decision tree may be generated by first generating a plurality of binary decision trees from samples of the subset, each binary decision tree having nodes associated with attributes. These multiple binary decision trees may be combined to form the initial binary decision tree by overlaying the multiple binary decision trees and discarding subtrees of the multiple binary decision trees of nodes having different attributes.

Thus it is another object of the invention to provide a method of creating an initial binary decision tree suitable both for records with numerical attributes and categorical attributes recognizing that most attribute databases will be mixed categorical and numerical attributes.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE DRAWINGS

FIG. 1 is a fragmentary pictorial representation of a training database such as is known in the prior art;

FIG. 2 is a process diagram showing the prior art steps of using the training database of FIG. 1 with a tree constructor to develop a binary decision tree suitable for classifying actual data;

FIG. 3 is an example binary decision tree showing root, intermediate and leaf nodes, each associated with an attribute, splitting predicate and classification;

DETAILED DESCRIPTION OF THE INVENTION

Figure 4:
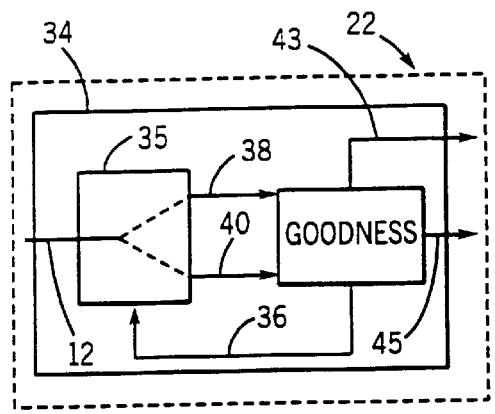
FIG. 4 is a block diagram of the tree constructor of FIG. 2.
Figure 5:
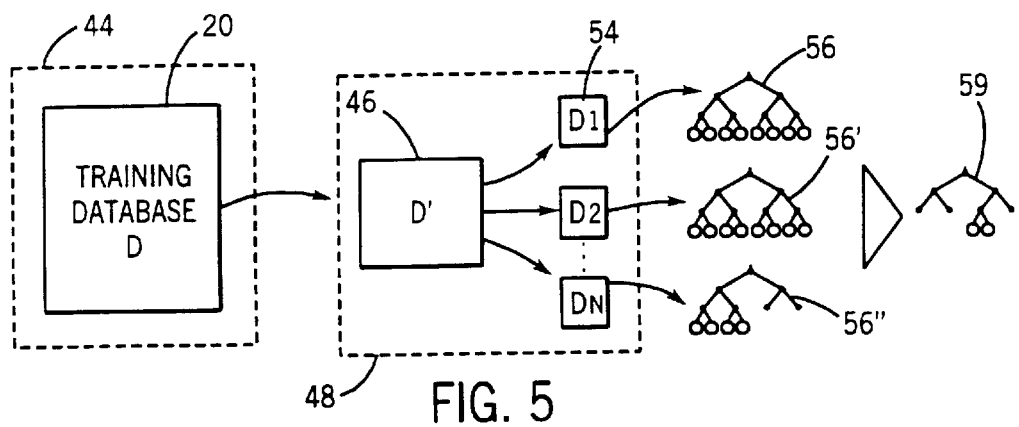
FIG. 5 is a schematic representation of a training database held low access memory from which a subset is obtained and used to generate a set of small samples used for construction of small sample binary decision trees and a resulting composite decision tree.
Figure 6:
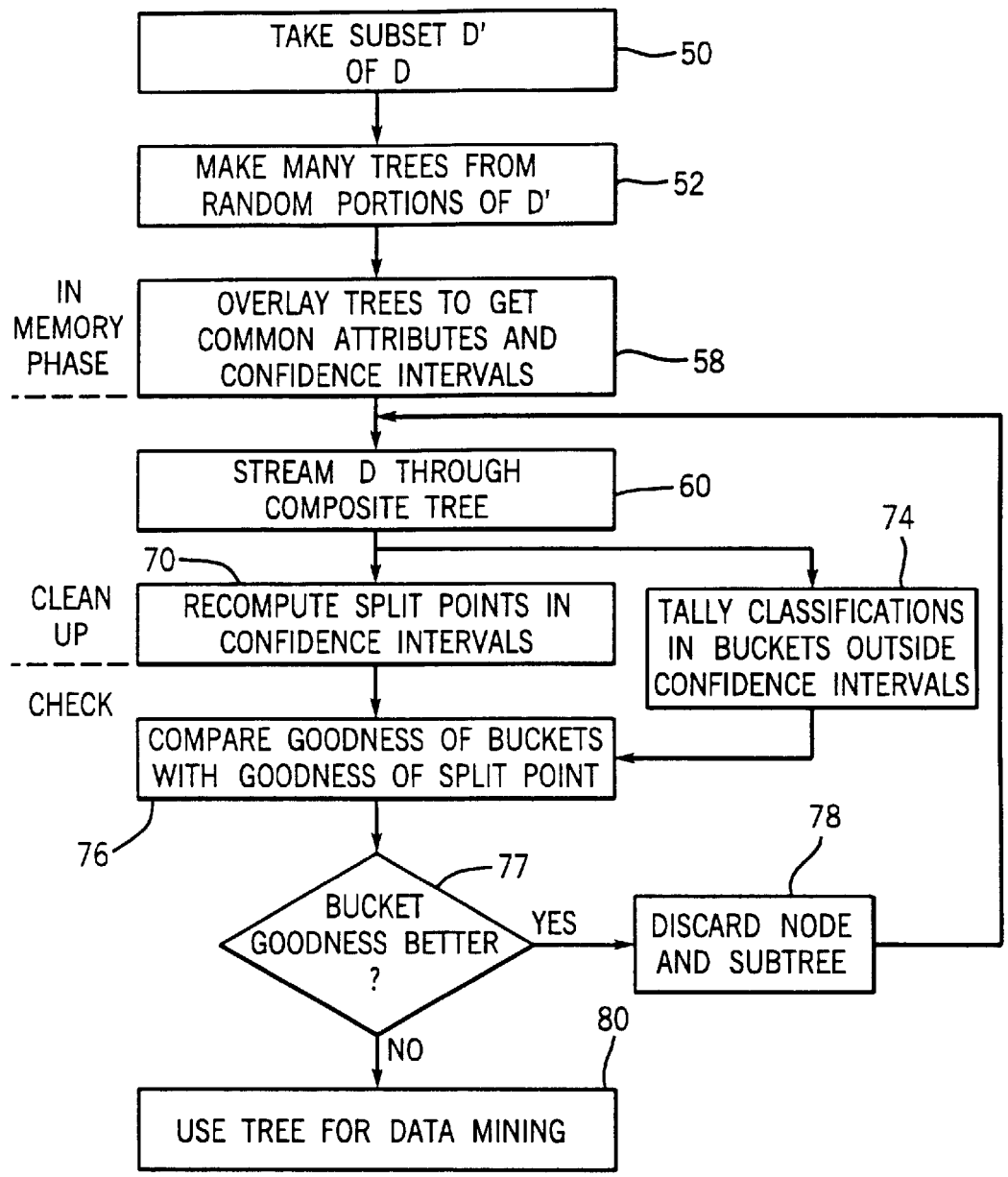
FIG. 6 is a flow chart showing the steps of the present invention.

Referring now to FIGS. 5 and 6, the training database 20 may be held in a low-access memory 44 such as magnetic tape or disk drive from which the data is preferentially removed in a serial fashion and where data transfer rates are relatively slow. The repeated operations required by the tree constructor 22 in which random access to the memory may be required thus become extremely time consuming.

Accordingly, the present invention as a first step (shown by process block 50 of FIG. 6) loads a subset database 46 being a subset of the training database 20 into high access memory 48. The high-access memory is typically solid state memory and has substantially smaller capacity than low-access memory 44 but faster and random data access.

The subset database 46 is selected from the records 12 of the training database 20 randomly with replacement, the latter term meaning that once a record 12 is selected from the training database 20, it is not removed but remains there to possibly be selected in a latter random selection.

Next at process block 52, many secondary subsets 54 labeled $D_1$ through $D_N$ are selected randomly with replacement from the subset database 46. Each of these secondary subsets 54 are provided to the tree constructor 22 as shown in FIG. 2 to generate a small-sample binary decision tree 56 being a binary decision tree based on the secondary subset 54.

Generally each of these small-sample binary decision trees 56 will be similar to each other insofar that the secondary subsets 54 reflect the statistics of the training database 20 but will nevertheless differ slightly because their samples from secondary subsets 54 are different.

Figure 7:
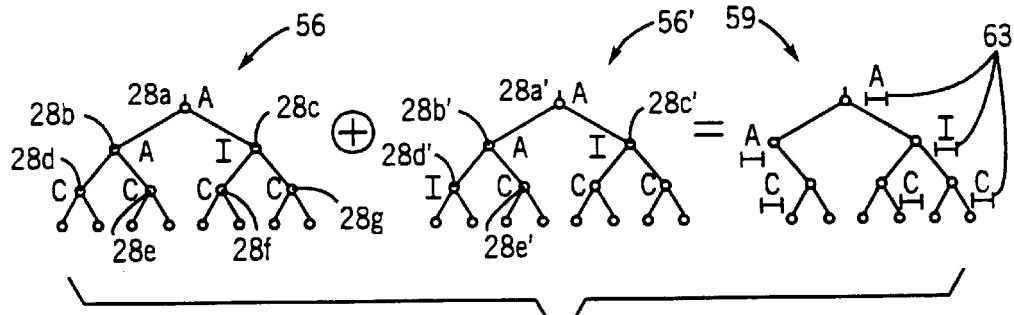
FIG. 7 is a graphical representation of the process of combining small sample binary decision trees into a composite decision tree having confidence intervals.

Referring now to FIGS. 6 and 7, next as indicated by process block 58, the various small-sample binary decision trees 56 are overlaid to create a single composite tree 59. The process of making the composite tree 59 must consider first the fact that the attributes 16 associated with the corresponding nodes 28 of different small-sample binary decision trees 56 may be different. For example, a first small-sample binary decision tree 56 (shown in FIG. 7) may have a root node 28a assigned to the attribute of AGE branching to a left and right node being AGE and INCOME, respectively, (attributes indicated by the initial letter of the attribute name). The AGE related node 28b may branch into two nodes 28d and 28e both assigned to the attributes of number of CHILDREN and the INCOME node 28c may bifurcate into two nodes 28f and 28g also associated with number of CHILDREN.

On the other hand, a second small-sample binary decision tree 56' may be identical to small-sample binary decision tree 56 in all ways except that the node 28b' associated with attribute of AGE may branch into a node 28d' associated with INCOME on the left and a node 28e' associated with CHILDREN on the right. The attribute 16 of node 28d' is inconsistent with the attribute 16 of corresponding node 28d in small-sample binary decision tree 56.

The act of overlaying compares each of the small-sample binary decision trees 56 in sequence to the next and truncates the composite tree 59 (originally matching one of the small-sample binary decision trees 56 at nodes 28 where there are variation in the attributes 16. Thus, a subtree associated with the nodes 28d and 28d' (including all children nodes 28 and 30) is removed to form the composite tree 59 as shown in FIG. 7.

This resultant binary decision tree 59" is then to be overlaid to the next small-sample binary decision tree 56 until all small-sample binary decision trees 56 have thus been incorporated into the composite tree 59.

After the attributes 16 associated with the nodes 28 have been made consistent in the form of the composite tree 59, the split points associated with the consistent nodes 28 are reviewed (as produced by the tree constructor 22) and are used to generate a confidence interval 63 representing a range in split points among the nodes 28 of the small-sample binary decision tree 56 represented in the composite tree 59. The lower bound of the confidence interval 63 is the lowest split point found for corresponding nodes 28 in any of the small-sample binary decision trees 56 and the upper bound is the highest most split point found for corresponding nodes 28 in any of the small-sample binary decision trees 56.

Thus the multiple small-sample binary decision trees 56 serve together to provide through composite tree 59 an indication of the degree to which the composite tree 59 may deviate from the true binary decision tree that would have been formed from the entire training database 20. The resultant composite tree 59 contains only nodes with attributes in common among all the small-sample binary decision tree 56 and confidence intervals 63 for each of those nodes 28 reflecting the variation in the split points from the overlay small-sample binary decision trees 56.

Figure 8:
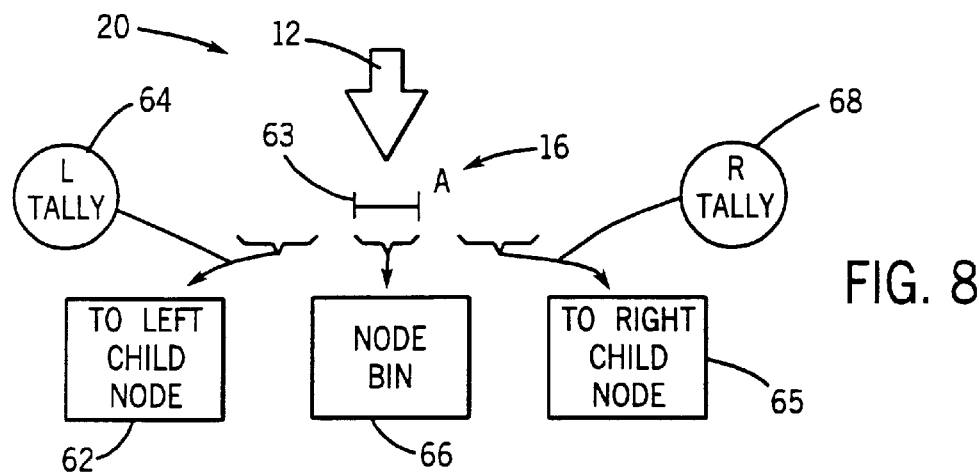
FIG. 8 is a schematic representation of the streaming of the full training database over the composite decision tree to obtain statistics for determining precise split points within confidence intervals of the composite decision tree.

Referring now to FIGS. 6 and 8 at a next step indicated by process block 60, every record from the training database 20 is "streamed" through the resulting composite tree 59. The streaming process presents each record 12 in sequence to the root node 28a of the composite tree 59 as shown in FIG. 8 and then (possibly) to a subsequent node 28 (in a similar process) as determined by the evaluation at the root node 28a. The attribute 16 of the node 28a is used to identify the appropriate attribute of the record 12 that is being evaluated and the value of that attribute, for example, AGE, is compared to the confidence interval 631. If the attribute value is below the confidence interval, then the record 12 is forwarded to the left child node 28 of the root node 28a as indicated by process block 62. This act of forwarding is tallied by right tally 64 recording the number of records that pass to the left.

If the attribute value of the given record 12 is greater than the confidence interval 63, then it is passed to the right child node 28 as indicated by process block 65 and that fact is tallied as indicated by right tally 68.

If the attribute value lies within the confidence interval 63, then the record 12 is stored at a node bin 66. The entire record 12 may be stored or as will be understood from the following description, only the statistics of the record necessary for the particular tree construction algorithm being used (e.g., the relevant attribute value). If the record 12 passes to the right or to the left as indicated by process block 62 and 65 to a node 28 other than a leaf node 30, the above described evaluation process is repeated for those nodes 28 until all records 12 have wound their way through the composite tree 59 to a leaf node 30 where they are stored in leaf node bins (not shown) similar to that of node bin 66 or have previously "stuck" at an earlier node bin 66.

It will be understood that the tallies 64 and 68 require very little storage capacity and the node bins 66, if the confidence interval 63 is reasonably accurate, will have very few records 12 and can be stored in high access memory 48. Further because this process is a sequential process, it may be rapidly accomplished with the low-access memory 44 and may require only a single streaming through the low-access memory 44 and thus is relatively fast.

Figure 9:
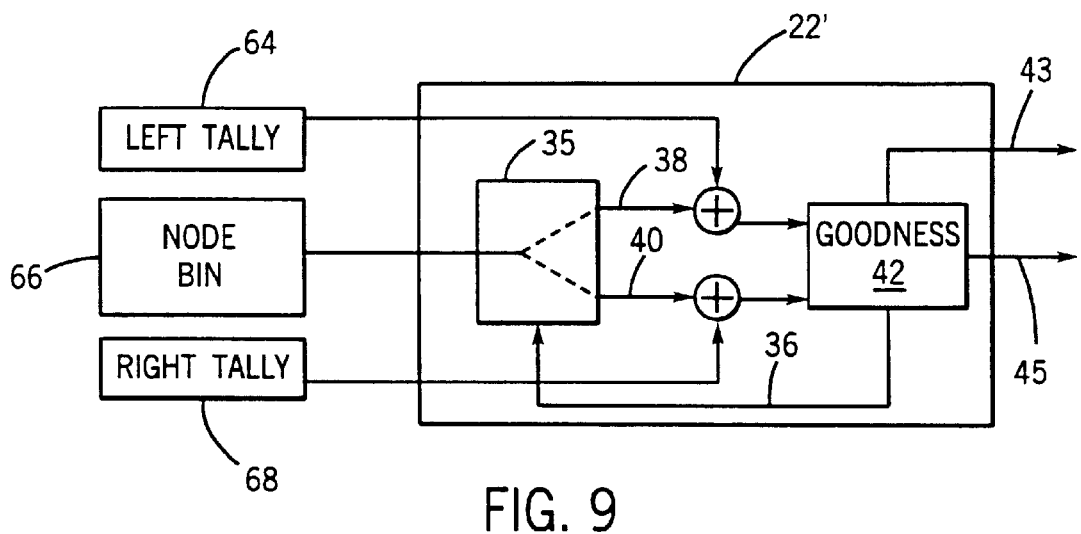
FIG. 9 is a figure similar to that of FIG. 4 showing a modification of the tree constructor for use with the statistics of FIG. 8.

Referring to FIGS. 6 and 9, the statistics of tallies 64 and 68 and from the node bin 66, may be used to refine the confidence interval 63 and, in particular, to determine a split point within the confidence interval 63 as shown by process block 70 of FIG. 6. Again for each node 28 trial splitting predicates 36 within the confidence interval 63 may be produced by the goodness evaluator 42 of the tree constructor 22 and provided to the sorter 35 which divides the records from the node bin 66 into a left group 38 and a right group 40. The numbers of these groups are supplemented by the left tally 64 and right tally 68 and provided to the goodness evaluator 42 which determines the goodness of the particular trial splitting predicate 36 according to those statistics. Thus at each node, for each trial splitting predicate 36, statistics are effectively obtained from the entire training database 20.

At the conclusion of this process, the goodness evaluator 42 provides a final splitting predicate 45 for that node and the next nodes 28 are reviewed in the same manner. When all the nodes 28 have been completed, a large sample binary decision tree (not shown) reflecting the statistics of the training database 20 is available.

The process is then complete if the confidence interval in fact embraced the correct split point. In order to make the process deterministic, however, this assumption is now checked.

Figure 10:
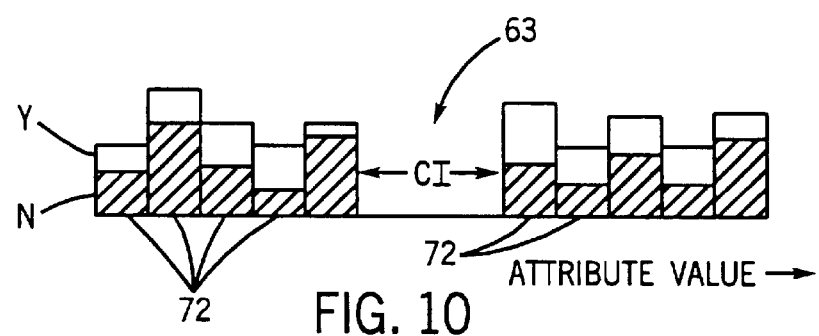
FIG. 10 is a depiction of bucket intervals outside of the confidence interval of the binary decision tree of FIG. 7 used for validating the binary decision tree produced by the present invention.

Referring now to FIGS. 10 and 6, at the time of streaming of process block 60 of the training database 20 through the composite tree 59, a tally of attribute values of the stream data at each node for bucket intervals 72 outside of the confidence interval 63 is maintained as indicated by process block 74. These bucket intervals 72 collect statistics within the bucket interval only for the relative proportions of the classification 18 and thus do not represent a significant memory burden.

Thus in the present example, each bucket interval 72 will have stored a number of the classifications 18 of YES and NO. At process block 76, the statistics from each of the bucket intervals 72 is then provided to the goodness evaluator 42 which determines a goodness value 43 for each bucket interval 72. This may be done by providing the stored tally statistics as the left and right groups 38 and 40 to the goodness evaluator 42. If this goodness value is no better than the goodness value associated with the split point in the confidence interval 63 previously determined at process block 70 (as determined at process block 77), then the large sample binary decision tree is correct as it stands. The tree may then be used to evaluate unclassified records for data mining as indicated by process block 80.

On the other hand, if the goodness of any bucket interval 72 is better than the goodness value determined at process block 70, then as indicated by process block 78, the confidence interval 63 associated with that node is discarded and the bucket interval 72 used in its place. All subsequent confidence intervals 63 for the subtree beneath that node are replaced with their previous confidence intervals and the streaming process of process block 60 and 70 is repeated for these nodes. Even in this case, the number of streams of the training database 20 are limited to a small number.

It will be apparent from the above description that the present invention may also be used for efficiently updating a binary decision tree 24 as new records are added to the training database 20. This may be most efficiently accomplished by saving the confidence intervals of tree 59 and the statistics collected during process block 60 as held in the left tally 64, the right tally 68 and the node bin 66. Then the new records for training may be streamed through the tree 59 to augment the previously collected statistics without the need to invoke a new scanning of the training database 20. Training records to be deleted can be handled in the same way, simply removing the records from the statistics collected at the nodes as the records to be deleted are streamed past the nodes.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A method of data mining using a computer system having a first memory holding a training database of a plurality of records having attributes, and a second memory smaller than the first memory but having better accessibility than the first memory, the method comprising the steps of:

(a) loading a subset of the training database into the second memory;

(b) operating on the subset with the computer to prepare a binary decision tree from the subset of the training database, the binary decision tree having nodes associated with confidence intervals defining ranges of the attributes;

(c) reviewing the entire training database of the first memory against the confidence intervals of binary decision tree to collect split point statistics related to the location of a split point within the confidence interval; and (d) using the split point statistics to assign a split point to each node;

whereby the number of times the training database must be loaded from the first memory is reduced.

2. The method of claim 1 wherein step (c) includes the step of reviewing the entire training database of the first memory against a plurality of bucket intervals outside of the confidence intervals to collect error statistics;

and including the step of:

(e) reviewing the error statistics to confirm that the confidence interval determined in step (d) is correct.

3. The method of claim 2 wherein the binary decision tree is for the purpose of establishing classes of records from their attributes and wherein step (e) evaluates the distribution of the classes of interest within the buckets against the distribution of the classes of interest within the confidence interval.

4. The method of claim 1 wherein the binary decision tree is for the purpose of establishing classes of records from their attributes and including further the step (e) of applying a record not in the training database to the binary decision tree of step (d) to determine its classification.

5. The method of claim 1 wherein the review of step (c) sequentially accesses each record of the training database only once.

6. The method of claim 1 wherein the first memory is a disk drive and the second memory is a solid state memory system.

7. The method of claim 1 wherein step (b) comprises the steps of:

(i) preparing a plurality of randomly selected secondary subsets of the subset of the training database;

(ii) preparing a binary decision tree for each of the secondary subsets;

(iii) overlying the binary decision trees of step (ii) and discarding subtrees of the trees below nodes having different attributes;

(iv) bounding the confidence intervals with the highest and lowest split point associated with matching attributes for each node.

8. The method of claim 1 wherein the split point statistics tally whether the records have attributes above or below the confidence interval and store at least a portion of the records having attributes within the confidence interval.

9. The method of claim 1 including further the steps of (e) reviewing an update training database against the confidence intervals of binary decision tree to augment the split point statistics related to the location of a split point within the confidence interval; and (f) using the split point statistics to assign an updated split point to each node.

10. The method of claim 9 wherein the update training data base includes records that should be added to the training database and wherein the augmentation of the split point statistics adds statistics from the split point statistics.

11. The method of claim 9 wherein the update training data base includes records that should be deleted from the training database and wherein the augmentation of the split point statistics deletes statistics from the split point statistics.

12. A method of data mining using a computer system having a first memory holding a training database of a plurality of records having attributes, and a second memory smaller than the first memory but having better accessibility than the first memory, the method comprising the steps of:
   (a) loading a subset of the training database into the second memory;
   (b) generating a plurality of binary decision trees from samples of the subset, the binary decision trees having nodes indicating attributes and two attributes sets defining a split;
   (c) combining the plurality of binary decision trees to form a composite binary decision tree by:
      (i) overlying the binary decision trees of step (b); and
      (ii) discarding subtrees of the trees below nodes having different attributes,
   wherein the composite binary decision tree includes at least one node, with which is associated a confidence interval defining a range of split points.

13. The method of claim 12 wherein the binary decision tree is for the purpose of establishing classes of records from their attributes and including further the step (e) of applying a record not in the training database to the binary decision tree of step (d) to determine its classification.

14. The method of claim 12 wherein the first memory is a disk drive and the second memory is a solid state memory system.

15. The method of claim 12 including further steps:
   (d) reviewing the entire training database of the first memory against alternative two attributes sets defining a split to collect error statistics; and
   (e) reviewing the error statistics to confirm that the binary tree determined in step (c) is correct.

16. The method of claim 14 wherein the binary decision tree is for the purpose of establishing classes of records from their attributes and wherein step (d) evaluates the distribution of the classes of interest with the alternative two attributes sets against the distribution of the classes of interest with the two attributes sets.

17. The method of claim 15 wherein the review of step (c) sequentially accesses each record of the training database only once.

18. The method of claim 12 wherein the first memory is a disk drive and the second memory is a solid state memory system.

* * * * *

UNITED STATES PATENT AND TRADEMARK OFFICE
CERTIFICATE OF CORRECTION

PATENT NO. : 6,442,561 B1
DATED : August 27, 2002
INVENTOR(S) : Johannes E. Gehrke et al.

It is certified that error appears in the above-identified patent and that said Letters Patent is hereby corrected as shown below:

Column 1,
Line 12, under "Statement Regarding Federally Sponsored Research or Development", please add:
-- This invention was made with United States government support awarded by the following agencies: NSF 9611037. The United States has certain rights in this invention. --

Signed and Sealed this

Eleventh Day of March, 2003

JAMES E. ROGAN
*Director of the United States Patent and Trademark Office*